United States Patent Office 2,945,808
Patented July 19, 1960

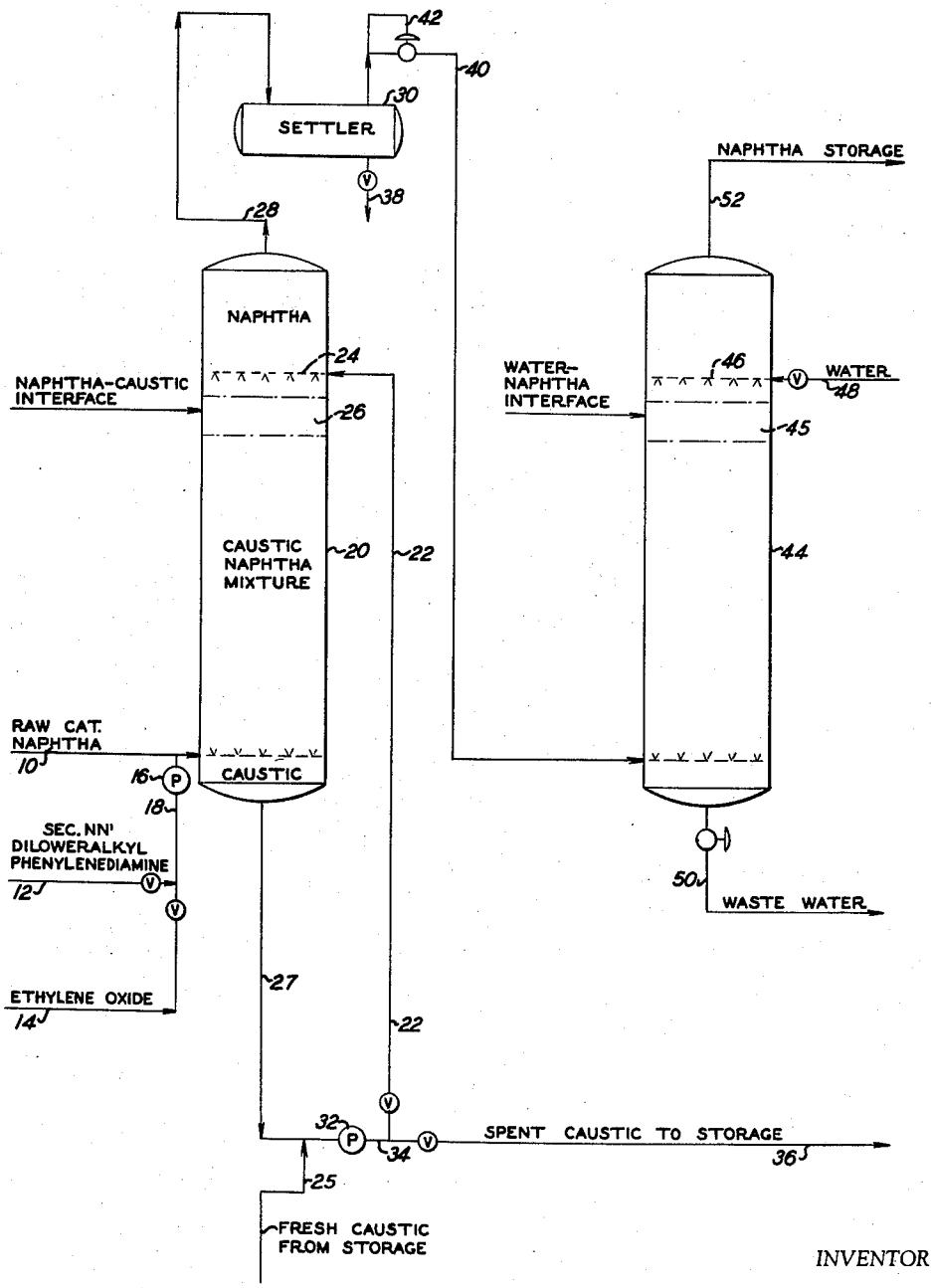
INVENTOR
CHARLES O. PETTY
BY
ATTORNEY

2,945,808
SWEETENING AND STABILIZING OF NAPHTHAS

Charles O. Petty, Tyler, Tex., assignor of one-half to La Gloria Oil and Gas Company, Tyler, Tex., a corporation of Delaware Filed Nov. 14, 1958, Ser. No. 773,897

13 Claims. (Cl. 208—204)

This invention is a continuation-in-part of my copending application Serial No. 565,289 filed December 21, 1955, and relates to improved sweetening and stabilizing of sour gum forming cracked naphthas. More particularly the invention relates to a combined organic epoxide and arylene diamine sweetening and stabilization of such naphthas.

It is known in the art that arylene diamines, such as phenylene diamines and more usually secondary NN′ di lower alkyl o or p-phenylene diamines, are useful inhibitors for gum forming cracked naphthas and also have a useful sweetening effect upon sour cracked naphtha of moderate RSH content, utilizing the oxidizing effect of the arylene diamine upon the mercaptan to form disulfide in the presence of an air injection step to enhance that oxidation. Such arylene diamine treatment of the art is relatively expensive, requiring a substantial storage period of about 15–20 hours of the naphtha containing arylene diamine at raised temperatures, above 100° F., over sweet caustic, and the caustic must be regenerated from time to time.

As described in my parent application, the addition of an organic epoxide, usually an alkylene oxide, such as ethylene oxide, for sweetening in the presence of a spent caustic of high, at least 5%, acid oil content reacts substantially quantitatively with mercaptans for form thioether alcohols, either from alkyl mercaptans or aromatic mercaptans. Such thioethers have in themselves a marked stabilizing effect upon the tendency of the sweetened naphtha to deposit less gum, which may be enhanced by further addition of gum inhibitors.

Moreover, as pointed out in my parent application, that alkylene oxide sweetening is outstandingly effective when it is catalyzed by an acid oil, i.e. extracted phenolates present in the caustic in quantity usually exceeding 5% which accelerates the sweetening and tends to regenerate the spent caustic, converting mercaptides to hydrocarbons soluble thioether alcohols, so that a spent caustic containing phenols is usefully used as a source of catalyst in the alkylene oxide sweetening. The spent caustic is continuously regenerated in that treating process. The alkylene oxide, however, is an expensive chemical so that the preliminary washing of a high mercaptan containing oil to reduce the initial mercaptan content desirably reduces the alkylene oxide requirement and produces a source of spent caustic having a useful high content of acid oils with which to catalyze the subsequent reaction with the ethylene oxide. Moreover, as pointed out in the parent application, that preliminary treatment with caustic removes the lower mercaptans, leaving higher hydrocarbon soluble mercaptans which, predominantly, the alkylene oxide sweetening agent is best suited for in further sweetening treatment. It is usual, for rapid sweetening, to use a slight excess of alkylene oxide for rapid sweetening and to sweeten to a low mercaptan content for some purposes, but not to an extreme mercaptan low or zero copper number.

The process of my parent application is substantially improved by the present invention wherein the alkylene oxide treatment is directly combined with an arylene diamine treatment for several advantages. In fact, the excess ethylene oxide that may have been used in my parent application for purposes of rapid sweetening can now be reduced to quatitative amounts, and even less with respect to the mecaptan because of the additional sweetening available from the arylene diamine. Again, the naphtha gum stabilization can largely be effected by the arylene diamine. The usefully high temperature for rapid sweetening that can be used in a rapid alkylene oxide sweetening is well complemented and equally useful at a raised temperature for additional sweetening with arylene diamine. As the alkylene oxide regenerates spent caustic, the extra procedure to regenerate a used caustic necessary in the known arylene diamine sweetening treatment may be omitted in the combination, and spent caustic may be used directly because it will soon become regenerated by continuous use of spent caustic in the procedure but, of course, where a regenerated acid oil containing caustic is available from other treatments, it may be used directly herein. Equally important as noted below, where sweet caustic is used on a low RSH raw naphtha, such as one having less than 0.002% mecaptan, the necessary acid oil becomes available by extraction from the raw naphtha being treated. Again, that extra air oxidation needed in the arylene diamine treatment is not necessary in the present combined treatment because the alkylene oxide enhances the oxidizing power of the arylene diamine whereby the extra air injection into the system is unnecessary.

Finally, the arylene diamine treatment as heretofore practiced requires storage over a sweet aqeuous alkaline medium in the run-down tanks at temperatures above 100° F. for substantially long periods of time to effect a final useful sweetening. In contrast, the present combined treatment may have the caustic immediately washed out of the sweetened gasoline and the sweetening effect results in a much shorter time without need for high temperature storage over caustic. Inasmuch, of course, as the arylene diamine sweetening is a slow acting sweetening agent, the greatly reduced alkylene oxide used therewith, according to the present invention, results in a somewhat longer sweetening than ordinary alkylene oxide as set forth in my parent application, even though much shorter than when using arylene diamine alone. Accordingly, the present process, while usefully applied for sweetening and stabilizing any gum forming sour naphtha, it is best applied to a cracked naphtha of relatively low mercaptan content having a high gum forming tendency, that is, one having a large quantity of olefines, such as more than 30%, and which usually also contains substantial quantities of aromatics, for example, sour light catalytically cracked gasoline.

According to the present invention, therefore, a sour cracked naphtha is sweetened by treating it with a small quantity of an organic epoxide and an arylene diamine in the presence of a high acid oil caustic, that is, one containing a substantial quantity of phenols at a temperature above about 100° F., usually treated in the range of 100–150° F. The alkylene oxide usually used is a lower alkylene oxide such as ethylene oxide or propylene oxide, although any organic epoxide having the formula

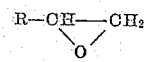

wherein R is a member of the group consisting of hydrogen, aliphatic hydrocarbon, cycloaliphatic hydrocarbon, aromatic hydrocarbon and chloromethylene, may be used. As indicated, it may be used in any substantial quantity as set forth in my parent application but for the great benefits of economy of the present invention it will usually be used in quantity less than about 0.05% by weight and usually less than the stoichiometric quantity needed to react with the mercaptan of the particular feed stock being sweetened.

The arylene diamine may be any known in the art, such as one having the formula R—NH—A—NH—R' wherein R and R' are the same or different members of the group consisting of hydrogen and lower alkyl having from 1 to 10 carbon atoms, preferably branched chain, and A is an arylene group of the character of phenylene, bi-phenylene and naphthalene, preferably phenylene, to which the amino groups are attached para (1—4) or ortho (1–2). The solublity of the arylene diamine in the cracked naphtha is enhanced by the presence of one or more groups on the arylene diamine and it is most usual for this purpose to substitute the arylene diamine by two NN' di lower alkyl groups. With such substitution the arylene diamine is preferably para phenylene diamine and the alkyl substituents are isopropyl, isobutyl, isoamyl, tertiary butyl, secondary amyl, active amyl, isohexyl, diisopropyl, tri isopropyl, diisobutyl, and the like. The arylene diamine concentration can range from about 0.004 to about 0.012% by weight of the naphtha, that is, about 1 lb. to 30 lbs. per 1000 barrels of naphtha.

The aqueous caustic may be from 5 to 50%, preferably 20 to 45% by weight of sodium hydroxide in water. For active catalytic effect is should contain at least 5% of phenols, preferably 10 to 40% by weight. That acid oil content is available as stated either by using a spent caustic having such phenol content, or by treating a raw phenol containing cracked naphtha with a sweet caustic until the phenol content therein builds up to active content. Usually when the phenol reaches the range of 30 to 40% the acid oil caustic wash is replaced by a sweet caustic to prevent excess phenol build-up in the caustic.

The sour naphtha, which may have been preliminarily caustic washed, or which generally contains only an average low quantity, such as up to about 0.002 weight percent of mercaptan, in the present procedure, has added thereto the requisite quantity of alkylene oxide and, preferably, di secondary NN' lower alkyl phenylene diamine as described, as by adding thereto a solution of these reagents in hydrocarbon to the naphtha stock to be treated, and then the naphtha containing sweetening components are washed at a temperature in the range of 100 to 150° F., countercurrently to acid oil containing aqueous caustic in a continuous wash. The washed and treated warm naphtha is then sent to a settling tank wherein droplets of aqueous caustic settle out. The treated naphtha is then given a light water wash to remove any further quantity of caustic, all treating steps of the napththa being at a temperature in the range stated.

The invention is further described in relation to the attached sheet of drawing which illustrates diagrammatically the procedure hereof.

A feed stock for sweetening and stabilizing treatment such as precaustic washed sour cracked gasoline, or a raw low sulfur naphtha such as light catalytically cracked naphtha having about 0.002% RSH or less, enters the system through line 10, and is commingled with a solution of NN' di lower alkyl phenylene diamine from line 12 and a solution of a lower alkylene oxide from line 14, fed by pump 16 from the combined lines 18 into line 10. The solution passes continuously into a point above the bottom of treating tank 20. Simultaneously acid oil in line 22 enters tank 20 at a point near the top and the caustic containing acid oils are distributed through a spray head 24 countercurrently downward to the upwardly passing naphtha in tank 20. The two solutions commingle at an interface at about point 26 and the gasoline sweetens rapidly at that point, the acid oil separating and moving downward by gravity. It collects in the bottom of the tank and is withdrawn therefrom by way of line 27. The treated gasoline rises countercurrently to the top of the tank 20 and is withdrawn overhead through line 28, passing to settling tank 30. The spent caustic in line 27 is picked up by pump 32 and recycled by way of line 34 to line 22 and through sprayhead 24 into the top of the treating tank as relatively continuous caustic recycle. The initial caustic entering through line 25 may be spent caustic in which event the caustic becomes regenerated quickly in the process. Some of the thioethers dissolve in the naphtha as described in my parent application. Also fresh caustic may be used, providing the naphtha is raw and contains extractable acid oils which are allowed to build up in the caustic as it is continuously recycled in contact with fresh raw feed. Of course, sweet caustic to which at least 5%, preferably 20% of acid oils, that is, phenols, are added, may also be used. When the acid oils in the caustic accumulate to substantially more than about 40%, they may be withdrawn from the system by way of line 36 to storage or for recovery of phenols.

The raw naphtha entering the system may be preheated by means not shown to the desired temperature range of 100–150° F. and simultaneously fresh caustic entering the system can, but does not usually need to be preheated, so that the continuous countercurrent washing contact of caustic and naphtha containing the sweetening and stabilizing reagents are maintained in the desired temperature range. Where the initial boiling point of the naphtha is lower than the preferred treating temperature, the system may be operated at sufficiently high pressure to maintain the entire treatment in the liquid phase. Liquid caustic accumulating in the bottom of settling tank 30 is withdrawn from time to time by way of line 38. The treated naphtha is withdrawn from the settling tank through line 40, usually at atmospheric or storage pressure, as maintained by pressure reducing valve 42, and passed to the bottom of a water wash tank 44 wherein the naphtha passes countercurrently to a fine spray of water sprayed into the ascending naphtha from a spray head 46 near the top of the tank 44, passed thereto from line 48, preferably, but not necessarily, warm water at the temperature of the system, the water and naphtha commingling in an interface 45. Waste wash water accumulating in the bottom of tank 44 is passed out of the system by way of line 50. The washed naphtha passes thence to a run-down tank or storage by way of line 52.

The following examples illustrate the practice of this invention.

EXAMPLE I

Raw light catalytically cracked gasoline is passed at a flow rate of 100 barrels per hour countercurrently to the aqueous caustic soda solution having a substantial content of acid oils circulated at a rate of 15 barrels per hour, both the caustic and the gasoline having the characteristics set forth in tabular form below and being intimately commingled in liquid interface as shown in the drawing, by introducing the caustic as a very fine mist-like spray. The temperature of the raw light catalytic gasoline is initially 122° F., the temperature attained in the treating tank is 118° F., and the final temperature of the catalytic cracked gasoline as passed to storage is 108° F. The raw cracked gasoline before passing into the treating tank has added thereto 1 lb. of secondary NN' di isobutyl p-phenylene diamine per hour, and 1 lb. ethylene oxide per hour. The treated gasoline after allowing settling of liquid caustic as shown in the drawing, is passed countercurrently to a fine water spray to remove traces of caustic, the water being added at the rate of 4 barrels per hour.

In operating the process according to this example, the starting caustic is 40 Bé. sweet caustic since, as will be noted, the raw light catalytically cracked gasoline feed stock already contains some phenol which is extracted by the caustic and continuously recirculated whereby the acid oil content thereof continuously builds up. When the acid oil content reaches about 30 volume percent and the caustic content reduced to about 34 Bé., the caustic is withdrawn and sent to phenol recovery and fresh 40 Bé. caustic is added to the system by way of line 25. The following analysis illustrates the results of this example.

Gasoline analysis:

| | Percent RSH, Wt. Percent | Total Sulfur, Wt. Percent | Phenols, Wt. Percent | Olefins, Vol. Percent | Aromatics, Vol. Percent |
|---|---|---|---|---|---|
| Raw light cat | 0.0034 | 0.020 | 0.012 | 45.0 | 30.0 |
| Treated light cat | 0.0004 | 0.012 | 0.0012 | 45.0 | 30.0 |
| Lt. Cat. run down tank | 0 | 0.014 | 0.0012 | 45.0 | 30.0 |

Caustic analysis:

| | Bé. Gravity | Acid Oils, Vol. Percent | RSH, Wt. Percent |
|---|---|---|---|
| Caustic | 34 | 30 | 0.00012 |

The treated light gasoline of this example shows the mercaptan content as .0004 before storage, the final figure of 0% mercaptan is the result after 6 hours of storage.

EXAMPLE II

The following plant operation shows the effect of treatment with ethylene oxide alone according to my parent application and the effect of secondary NN' di iso butyl p-phenylene diamine combined with a substantially decreased quantity of ethylene oxide. It will be seen that the mercaptan in the run-down tank has decreased to zero (0) with both reagents and the quantity of gum is greatly reduced. The initial gasoline feed stock, the flow rate to the treaters, the flow rate of caustic and the analysis of the caustic and final washing treatment with wash water, was the same as in Example I.

*Light catalytically cracked gasoline*

| Run Down Tank | | Treating Column | | Barrels Per Day Gasoline | Pounds Per Day | | Temp. of Gasoline ° F. |
|---|---|---|---|---|---|---|---|
| Percent RSH | Mg./100 ml. Gum | To (Percent RSH) | From (Percent RSH) | | Ethylene Oxide | Phenylene-diamine | |
| 0.00028 | 80 | 0.0036 | 0.00028 | 2,600 | 60 | 0 | 110 |
| 0.00032 | 60 | 0.0032 | 0.00032 | 2,650 | 60 | 0 | 110 |
| 0 | 1.0 | 0.0034 | 0.00032 | 2,650 | 60 | 20 | 112 |
| 0 | 1.0 | 0.0032 | 0.00034 | 2,650 | 50 | 20 | 112 |
| 0 | 2.0 | 0.0034 | 0.00036 | 2,700 | 40 | 20 | 114 |
| 0 | 1.0 | 0.0034 | 0.00038 | 2,700 | 20 | 20 | 112 |
| 0 | 1.0 | 0.0034 | 0.00038 | 2,700 | 23 | 20 | 112 |
| 0 | 1.0 | 0.0034 | 0.00036 | 2,650 | 22 | 20 | 112 |

Accordingly, it will be seen by the present procedure great economies in the use of alkylene oxide for sweetening is possible when using small supplementary quantities of an arylene diamine, with the further process advantages listed, including both improved sweetening and gum stability.

The method may be applied to any sour cracked naphtha usually one having a high olefin and sometimes aromatic content and wherein gum formation in storage is a problem. It is most usefully applied to a raw cracked naphtha feed stock whose mercaptan content is in the range of about 0.002 weight percent or less, whereby such naphtha, like light catalytically cracked naphtha, may be directly treated, its normal phenolic content building up to the requisite acid oil content of the caustic. Where the naphtha contains higher quantities of mercaptan it is preferably given a preliminary caustic wash, whereby the mercaptan content is reduced by the caustic and a spent caustic acid oil comprising at least 5% phenols is formed, which may be used as a contact catalyst in the subsequent sweetening with both ethylene oxide and arylene diamine. While the treatment for rapid sweetening is preferably applied at the raised temperature stated for acceleration of the sweetening reaction, substantial but less efficient sweetening is also available at lower more normal temperatures. The process is best applied to a cracked naphtha which will usually be sent to storage for at least a 6 hour run-down tank storage period with, of course, the advantage over the old arylene diamine sweetening treatment that it need not be stored over caustic. However, upon leaving the treater as the data listed above shows, the gasoline is already substantially sweetened and may be cooled and shipped directly with the advantage that further sweetening effect results in any subsequent handling.

Certain modifications will occur to those skilled in the art and accordingly it will be understood that the above description may be regarded as exemplary and not limiting except as defined in the claims appended hereto.

I claim:

1. Process of sweetening and stabilizing sour cracked naphtha comprising contacting said naphtha with small quantities of both an organic epoxide and an arylene diamine in the presence of aqueous caustic alkali containing acid oils.

2. Process of sweetening and stabilizing sour cracked naphtha comprising contacting said naphtha with small quantities of both a lower alkylene oxide and a secondary NN' di lower alkyl phenylene diamine in the presence of aqueous caustic alkali containing acid oil.

3. Process of sweetening and stabilizing sour cracked naphtha comprising contacting said naphtha with small quantities of both ethylene oxide and secondary NN' di isobutyl paraphenylene diamine, in the presence of aqueous caustic alkali containing acid oils.

4. Method of sweetening and stabilizing sour cracked hydrocarbon naphtha comprising dissolving small quantities of an organic epoxide and an arylene diamine in the naphtha, contacting the naphtha solution at a temperature in the range of 100-150° F. with aqueous caustic alkali solution containing acid oils, and then separating the aqueous caustic acid oil solution from the treated naphtha.

5. The method as defined in claim 4 wherein the naphtha solution contact with aqueous caustic is a continuous countercurrent wash, and the treated naphtha solution has entrained drops of caustic solution, said entrained caustic being removed first by settling the treated naphtha and then by washing the treated naphtha with water.

6. The method as defined in claim 4 wherein the epoxide is a lower alkylene oxide and the arylene diamine is a secondary NN' di lower alkyl phenylene diamine.

7. The method as defined in claim 5 wherein the organic epoxide is a lower alkylene oxide and the arylene diamine is a secondary NN' di lower alkyl phenylene diamine.

8. The method as defined in claim 6 wherein the organic epoxide is ethylene oxide and the arylene diamine is a secondary NN' di isobutyl p-phenylene diamine.

9. The method as defined in claim 4 wherein the cracked naphtha contains less than about 0.002% by weight of mercaptan before treatment.

10. The method as defined in claim 4 wherein the cracked naphtha normally contains more than 0.002% by weight of mercaptan and is given a preliminary caustic wash to reduce the mercaptan content to less than about 0.002% by weight before applying said sweetening and stabilizing treatment.

11. Method of sweetening and stabilizing a cracked gum forming hydrocarbon naphtha comprising contacting the naphtha at a temperature in the range of 100-150° F. with up to 0.5% by weight of lower alkylene oxide and up to 0.012% by weight of secondary NN' di lower alkyl paraphenylene diamine in the presence of aqueous caustic containing from about 5 to 40% by weight of acid oils and then removing the aqueous caustic solution.

12. The method as defined in claim 11 wherein the cracked hydrocarbon naphtha is catalytically cracked naphtha comprising substantial quantities of olefines and aromatics and has a mercaptan content not substantially exceeding 0.002 weight percent.

13. Process of sweetening and stabilizing sour cracked naphtha comprises treating said naphtha with small quantities of an alkylene oxide and a secondary NN' di lower alkyl phenylene diamine.

References Cited in the file of this patent

UNITED STATES PATENTS

| | | |
|---|---|---|
| 2,737,472 | Chenicek | Mar. 6, 1956 |
| 2,849,373 | Miron | Aug. 26, 1958 |
| 2,862,804 | Petty | Dec. 2, 1958 |